(12) United States Patent
Fuzell-Casey et al.

(10) Patent No.: US 8,484,090 B2
(45) Date of Patent: Jul. 9, 2013

(54) LIST-BASED COUPON SYSTEM AND METHODS

(75) Inventors: Jacquelyn Fuzell-Casey, Reno, NV (US); Timothy Daniel Casey, Reno, NV (US)

(73) Assignee: Google Inc., Mountain View, CA (US)

( * ) Notice: Subject to any disclaimer, the term of this patent is extended or adjusted under 35 U.S.C. 154(b) by 193 days.

(21) Appl. No.: 12/684,077

(22) Filed: Jan. 7, 2010

(65) Prior Publication Data

US 2010/0106591 A1    Apr. 29, 2010

Related U.S. Application Data

(60) Continuation of application No. 12/177,472, filed on Jul. 22, 2008, now Pat. No. 7,848,962, which is a division of application No. 10/226,456, filed on Aug. 26, 2002, now Pat. No. 7,424,447.

(51) Int. Cl.
*G06Q 30/00* (2012.01)

(52) U.S. Cl.
USPC ..................................... 705/26.1; 705/14.23

(58) Field of Classification Search
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 5,297,266 A | 3/1994 | Tanaka | |
| 5,887,271 A | 3/1999 | Powell | |
| 6,123,259 A | 9/2000 | Ogasawara | |
| 6,129,276 A | 10/2000 | Jelen et al. | |
| 6,133,853 A * | 10/2000 | Obradovich et al. | 340/905 |
| 6,185,541 B1 | 2/2001 | Scroggie et al. | |
| 6,292,786 B1 | 9/2001 | Deaton et al. | |
| 6,415,261 B1 | 7/2002 | Cybul et al. | |
| 6,505,046 B1 * | 1/2003 | Baker | 455/456.3 |
| 6,587,835 B1 * | 7/2003 | Treyz et al. | 705/14.64 |
| 6,616,049 B1 * | 9/2003 | Barkan et al. | 235/472.03 |
| 6,912,507 B1 | 6/2005 | Phillips et al. | |
| 7,231,357 B1 * | 6/2007 | Shanman et al. | 705/14.23 |
| 7,236,271 B2 * | 6/2007 | Silverbrook | 358/473 |
| 7,256,736 B2 * | 8/2007 | Johnson | 342/386 |
| 7,472,379 B2 * | 12/2008 | Chessell et al. | 717/132 |
| 7,885,852 B2 * | 2/2011 | Banerjee et al. | 705/14.1 |
| 8,332,272 B2 * | 12/2012 | Fisher | 705/16 |
| 2002/0099610 A1 * | 7/2002 | Marion | 705/21 |
| 2002/0128903 A1 * | 9/2002 | Kernahan | 705/14 |
| 2002/0138345 A1 * | 9/2002 | Dickson et al. | 705/14 |
| 2002/0178013 A1 * | 11/2002 | Hoffman et al. | 705/1 |
| 2003/0004798 A1 * | 1/2003 | McAuliffe et al. | 705/14 |
| 2003/0015585 A1 * | 1/2003 | Wike et al. | 235/383 |
| 2004/0054574 A1 * | 3/2004 | Kaufman et al. | 705/14 |

OTHER PUBLICATIONS

Suarez, Monica Gomez "Shelf space assigned to store and national brands: A neural networks analysis", International Journal of Retail & Distribution Management, v33n11/12 pp. 858-878, 2005.*

(Continued)

*Primary Examiner* — Naeem Haq
(74) *Attorney, Agent, or Firm* — Johnson, Marcou & Issacs, LLC (57) ABSTRACT

A list-based coupon system that enables users to create a list of items to obtain, purchase or locate within a store or other geographic area, and provides users with coupons under a variety of different conditions.

21 Claims, 5 Drawing Sheets

OTHER PUBLICATIONS

Rao, Bharat, "Emerging Business Models in Online Commerce", Institute for Technology and Enterprise, Dec. 12, 1999.
Merriam-Webster's Collegiate Dictionary, tenth edition.
U.S. Appl. No. 10/226,456, filed Aug. 26, 2002.
U.S. Appl. No. 12/177,472, filed Jul. 22, 2008.
U.S. Appl. No. 12/684,055, filed Jan. 7, 2010.
Author: Haq, N. Title: Office Action issued in co-pending U.S. Appl. No. 12/684,055, filed Jan. 7, 2010 pp. 1-6 Date: Dec. 7, 2010.
Author: Haq, N. Title: Office Action issued in co-pending U.S. Appl. No. 12/177,472, filed Jul. 22, 2008 pp. 1-11 Date: Dec. 2, 2009.
Author: Haq, N. Title: Office Action issued in co-pending U.S. Appl. No. 10/226,456, filed Aug. 26, 2002 pp. 1-8 Date: Nov. 14, 2006.
Author: Haq, N. Title: Office Action issued in co-pending U.S. Appl. No. 10/226,456, filed Aug. 26, 2002 pp. 1-10 Date: Oct. 18, 2007.
Author: Haq, N. Title: Final Office Action issued in co-pending U.S. Appl. No. 12/684,055, filed Jan. 7, 2010 pp. 1-6 Date: Jul. 20, 2011.
Author: Haq, N. Title: Final Office Action issued in co-pending U.S. Appl. No. 12/177,472, filed Jul. 22, 2008 pp. 1-6 Date: Jun. 8, 2010.
Author: Haq, N. Title: Office Action issued in co-pending U.S. Appl. No. 10/226,456, filed Aug. 26, 2002 pp. 1-8 Date: May 3, 2007.
Asthana et al., An Indoor Wireless System for Personalized Shopping Assistance, *AT&T Bell Laboratories*, pp. 1-6, Jan. 1, 1994.

* cited by examiner

LIST-BASED COUPON SYSTEM AND METHODS

CROSS-REFERENCES TO RELATED APPLICATIONS

This application is a continuation of and claims priority to U.S. patent application Ser. No. 12/177,472, filed Jul. 22, 2008 and entitled "List-Based Selection System and Methods for Using the Same," now U.S. Pat. No. 7,848,962, which is a divisional of U.S. patent application Ser. No. 10/226,456, filed Aug. 26, 2002 and entitled "List-Based Selection System and Methods for Using the Same," now U.S. Pat. No. 7,424,447. The complete disclosure of each of the above-identified applications is hereby fully incorporated herein by reference.

BRIEF DESCRIPTION OF THE INVENTION

The present invention is related to systems for locating information and objects and marketing and promoting products and services, and more particularly to a selection system that enables users to create a list of items to obtain, purchase or locate within a store or other geographic area, provides users with visual or aural cues as to the location of items on their list, progresses through the list of items as each item on the list is selected or marked off, and provides discounts toward, information about, or alternatives to the selected items at least partially based on data entered by the user.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Electronic organizers typically include a number of different functions, such as a contact/address list, a calendar/date book, and a To Do list. While the contact list and calendar functions are popular with many users, the To Do list and other list functions are rarely used because they have limited utility. For example, while a user could write anything she wanted to on the electronic list, other than highlighting an entry, indicating an entry has been completed, or deleting an entry, the list performs no other function. Likewise, with a paper list, users write entries on the list, highlight the entries, cross the entries off the list, or erase the entries. In this sense, an electronic list is not really different from a paper list, other than the medium on which it is created. In other words, the electronic list is not interactive.

The medium of the electronic list does, however, make it possible for the electronic list to be something more than an electronic version of a paper list. Electronic organizers such as Palm and Microsoft Pocket PC compatible devices can be programmed to provide greater utilities for an electronic list. For example, a shareware web clipping application called Mobile List 1.0 allows different groups of users to manage and share lists of information and to access those lists with mobile devices. Although users create these lists, the lists themselves perform no interactive function. A similar shareware software application is TealInfo v3.11 by TealPoint Software that allows users to create lists, reference tables, numbers, and guides in data "Folios," which look and feel like mini applications, but these mini applications are limited to running on the mobile device on which the application is created, and not in conjunction with external devices.

Programmed lists are also used to locate addresses and stores external to the mobile devices on which they are created, but these lists do not interact with external devices. For example, with Vicinity BrandFinder 1.3, a user can select a branded restaurant or store from a pre-created list, and the Palm organizer will provide the user with information about the nearest selected restaurant or store to the user based on the user's current address or location, as entered by the user. Likewise, shopping list software, such as SplashShopper by SplashData, a shareware application for Palm operating system ("OS") handhelds, enables users to build lists of groceries to buy, books to read, movies to rent, etc.

While programs such a SplashShopper include a number of built in details that make it easier for users to build useful lists, such as a preloaded list of generic names for items to buy (i.e., apples, bottled water, bologna, bagels), preloaded categories for each generic item (i.e., fruits, beverages, deli meats, breads), the user has to enter the price for each item and the aisle numbers where the items can be found. For example, the only way a user can put on their list that bottled water costs $0.99/bottle, and can be found on Aisle 7A, is because the user has previously gone through the laborious process of entering the price and location information for bottled water. Generic items, such as "bottled water," are not brand specific so users cannot select among different types of bottled water at different prices and possibly even in different locations within the store (i.e., a general aisle versus a specialty food section). If a user wanted to skip the generic items and create their own list, they could, but they would have to enter all of the details, such as the name of the item, its category, price, location, etc., which can be awkward and time consuming on a handheld device.

An alternative system is described in U.S. Pat. No. 6,129,276, issued to Jelen, et al., which discloses a shopping list that can be created by using a bar code scanner to input Uniform Product Codes from the labels of previously purchased products or manufacturer's coupons, in addition to hand inputting information.

Other shopping list programs, which do not use scanned information, such as Shopping List Deluxe by Spitting-Image Software, include preloaded data, such as the type of units an item is packaged in (i.e., plastic, box, jar, can), and the amount needed in units (i.e., ½ pound, 20 ounce, 5 medium sized). Shopping List Deluxe even allows users to create a map of their favorite store by copying an empty store into their handheld, adding or removing items and locations within the store, and assigning aisle numbers to the store locations. Users can also share their store maps with other users over the Internet. There are a number of problems with such maps, including: (1) stores frequently changing the location of items within the stores; (2) the impracticality of users manually entering the thousands of different items found in each store; and (3) fully loaded maps would be so full of information that they would be too inconvenient to be useful.

U.S. Pat. No. 6,185,541, issued to Scroggie, et al., combines a shopping list with a coupon/information delivery system. To receive the shopping list generator and information, a user must first log into the system through a computer network and register with the system. The user can thereafter browse through information on the system over the World Wide Web or via email. If a user chooses a coupon (purchase incentive), the user must provide additional personal information and designate a specific retailer for redemption of the coupon. In accordance with the Scroggie system, users can get focused incentives if they supply a unique identification, the purchasing information (i.e., a credit card) that will be used for in-store purchases, and have established a record of past shopping behavior upon which the focused incentives can be based. U.S. Pat. No. 6,415,261, issued to Cybul, et al., discloses a frequent shopper program that is likewise based on collecting a customer's shopping history at the point of sale system within the retail store and using that information to determine the customer's entitlement to frequent shopper discounts.

Jelen, et al. also disclose that lists can be transmitted to base units situated at a retailer via a computer network and then downloaded onto bulky computer terminals affixed to shopping carts within the retailer's store when the user visits the store. The portable customer terminal, which is coupled to a bar code scanner, then communicates with the base unit to identify the terminal's general location within the store and to communicate the shopper's product purchases as they are scanned into the terminal and to download advertisements to the user based on the scanned information or the user's location within the store. Scanned in products can then be added to or removed from the shopper's purchase list, and used to create a running expense total. By establishing various zones within the store, unique advertisements for each of the zones can be transmitted to the shopper when in each zone. Despite its location sensing capability, the Jelen, et al. system does not identify the actual location of items within the store to the shopper, and despite its ability to communicate with a host system operated by the retailer, the system does not verify and confirm the shopper's list against the retailer's database of existing products. In other words, the shopping list is a static feature of the Jelen, et al. system, rather than a location and selection tool.

GPS-based devices in electronic organizers and automobiles include functions that can simplify the process of finding the location of a single item, such as an address, within a large area, such as a metropolitan area, but they do not assist users in finding a sequential list of items within such an area. GPS devices also operate in conjunction with external GPS navigation systems so they are not totally dependent on user-entered information in order to function properly. While some GPS devices enable users to select locations based on pre-created lists, once a user has entered a location into the GPS device, the user can add that location to a list created by the user. Once a location has been chosen from a list, the GPS device will communicate with the GPS navigation system (such as a satellite) and calculate the route (based on user preferences, such as shortest route, fastest route, etc.) for the user to take in order to get to the chosen location. Theoretically, a user could create a list of locations to visit and simply run down that list as each location is visited, but the user would have to re-engage the GPS device after each item on the list was located in order to get the system to identify the location of the next item. In other words, the GPS device would not automatically move on to the next location as each location is visited, and other than providing route and address information to the location, the user is provided with no other information about the chosen location.

An additional example is the Pocket Wine List 1.01, which enables users to match food to pre-created lists of wine, so as to find the most appropriate wine for certain types of food. While the Pocket Wine List includes information about each of the wines on the list, it operates in the same fashion as a physical reference book about wine. Hence, the Pocket Wine List is just an electronic reference book and is not an interactive list.

Internet users can also shop for groceries and many other items on-line through the use of various websites. Many of these sites include an extensive list of items available from that retailer, the price of each item, the quantity available, the sizes, etc., like shopping list software, only based on the information provided by the website. Most on-line purchase websites use so-called "shopping cart" software for holding items selected by users while they shop on-line and for simplifying the checkout and purchasing process. Once a user has purchased selected items, the retailer collects the items from their store or warehouse and delivers them to the user. Internet shoppers at such websites do not, however, get to select the specific items them may want to purchase. While this may not be significant for generic items like computer software in shrink-wrapped packages, it makes a big difference when the item being purchased is a bag of fruit or vegetables. For example, the fruit or vegetables might not be of the size, odor, ripeness or quality that the user would have chosen had the user been in the store making the selections. Likewise, if a can of food is delivered to the buyer with a dent in the can, the buyer doesn't know if it was dented after being collected by the retailer or was dented during delivery to the store, but either way, if the buyer does not trust dented cans, the buyer's only choice is to reject the can when it is delivered or return it later, order it again, and hope it is correct the next time.

None of the organizer based-lists, locater devices or Internet shopping aides discussed above collectively enable a user to create their own list of items on the organizer or locater, communicate with external devices to locate each of the items within a geographically limited area, sequentially progress through the list of items as each item is selected, and provide discounts toward, information about, or alternatives to the selected items.

Proximity marketing or advertising enables sellers to offer product or service information or discounts to potential customers that are near an item to be sold. Within a grocery store, for example, advertisements for products sold within the store are placed on the aisle racks, on shopping carts, on signs hanging from the ceiling, and even on the flooring. Although such advertisements may be placed in close proximity to the items being marketed, the proximity marketers have no actual information as to whether potential customers are interested in the product being advertised, other than by assuming that they might be interested in products near their location in the store.

Another proximity marketing technique involves broadcasting messages, such as wireless email messages, to potential customers' wireless devices as those customers pass by the outside of a store. Again, the marketers of such information have no idea if a passerby is interested in the products or services of the store broadcasting the messages, that a passerby will even be looking at their wireless device at an appropriate point in time, or that the device is capable of receiving such messages. A slightly improved technique is practiced by a virtual queuing system called the Q-bot, which is a wireless device issued to users wishing to reserve a position in a line for a popular ride at an amusement park while continuing to walk around the park. The Q-bot system can track a user's location within the park and offer them discounts on food or other items when they near a restaurant or other facility. The Q-bot system, however, still has no idea whether users are interested in the restaurant or facility at the time such information is provided, nor does the Q-bot system enable users to create their own list of items in which they are interested.

Target stores have adopted a different approach to offering customers discounts on items through a paperless coupon system that enables the store to personalize promotions. A customer must first download offers from Target displayed on their home computer onto a Target credit card embedded with a computer chip, using a card reader that Target provides for free. The customer then uses the card at Target to redeem the coupons. Each Target store can then keep track of how much of certain items a customer has purchased and offer that customer subsequent discounts on related items, or otherwise track the customer's buying patterns and adjust their promotions accordingly.

A similar type of system is described in U.S. Pat. No. 5,887,271, issued to Powell, which includes a smart card, a display kiosk, and a checkout station in the checkout area of a store. In accordance with Powell, the customer comes into the store with the smart card pre-loaded with coupons the customer hopes to redeem, inserts the card into the kiosk to view the location of products corresponding to the coupons stored on the card, goes about the store attempting to find the products, and redeems the coupons upon completion of shopping by inserting the card into the checkout station. U.S. Pat. No. 5,887,271, issued to Deaton, et al., describes a similar smart card system, with a similar kiosk for displaying coupon offers, like that disclosed in Powell, but which uses the customer's real-time product purchase information, collected from a point of sale system, to generate incentives that can be presented to the customer during the shopping transaction.

While the Target system and Powell smart card system do enable users to predetermine the items they are interested in purchasing at a discount, users have to determine what products they want based on the coupons being offered, rather than being able to select the items they want and then determine if any coupons apply. Both systems are also restricted to offering customers coupons before they start shopping rather than while they are actively shopping in the store. The system described by Deaton, et al., at least adds the ability to offer customers coupons while they are checking out, but not while they are actually shopping and in a position to evaluate whether they want a product based on the coupon or not. The Q-bot system and similar proximity marketing systems collect no information about the particular interests of a consumer and use mere conjecture when offering information or discounts, or force customers to choose discounted products that may not otherwise be of interest to the consumer. In other words, the companies running these promotions can only make guesses about what might interest a user at a particular time based on prior purchases by that user or their present location. Such companies do not use information about a user's current wants or needs to target marketing promotions specific to that user based on such wants or needs.

DETAILED DESCRIPTION OF THE INVENTION

The present invention is related to a selection system, and more particularly to a system that enables users to create an interactive list of items to select or locate within a store or geographic area, provides users with cues as to the location of such items within the store or area, progresses through the interactive list as such items are located, and provides information about, discounts on or alternatives to such items. The selection system can also market information to the user based on the interactive list of items and/or the user's proximity to an area or product.

The interactive list is created and displayed on a portable computing device ("PCD"), such as a portable digital assistant or similar device. The PCD is an important component of the selection system of the present invention, although the type of device utilized is not significant. A smart phone that complies with the GSM (Global System for Mobile communications) is one example of the type of PCD that could be utilized. A personal digital assistant ("PDA") modem that can be plugged into a notebook computer, such as the Sierra Wireless Aircard 550/555, and which doubles as a cell phone, could also be used. The preferred PCD, however, is a handheld or pocket-size device that enables a user to organize data by scheduling appointments on a calendar, listing names and addresses in an address book, creating To-Do lists, sending and receiving email, and performing other programmed functions. PCDs are usually designed to work with a user's desktop personal computer, where they can interconnect the two devices to share information, program the PCD, or even recharge its batteries. Many PCDs can be programmed through the use of removable memory devices containing preinstalled programs.

There are a large number of different commercially available PCDs, ranging in size from that of a credit card to that of a small laptop computer. For example, the Palm i705 Handheld includes standard PCD applications, such as a date book (calendar), addresses book, To Do list, note pad, memo pad, and calculator, but also is capable of providing wireless email and wireless Internet connectivity, and communicating with compatible devices through an infrared port. The software operating systems of most PCDs are based on three common operating system platforms, the Palm OS, Microsoft Windows CE OS, or Microsoft Pocket PC OS, although other less popular operating systems or completely different operating system platforms could also be used. The Palm i705 Handheld, for example, uses Palm OS Software 4.1. Most PCDs can be programmed to perform non-standard applications, such as shopping list software, by either uploading new programs onto the PCD through a hardwire connection, a removable memory device, or wirelessly. PCDs that include expansion card slots for receiving memory devices can be programmed to perform new operations requiring substantially more memory than is typically internally provided by a PCD.

Figure 1:
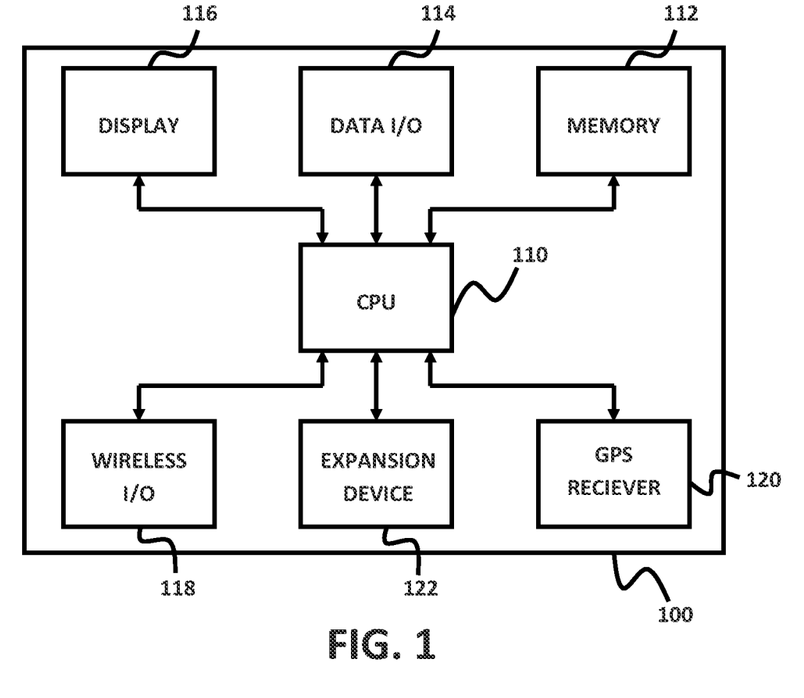
FIG. 1 is a block diagram illustrating the portable computing device utilized in the selection system of the present invention.

A block diagram illustrating the basic functionality of a PCD 100 in accordance with the preferred embodiment of the present invention is illustrated in FIG. 1. The central processor unit ("CPU") 110 operates in conjunction with software (such as the Palm OS or a Microsoft operating system) stored within the CPU and the memory 112 to control the operation of the PCD 100. As previously noted, the memory 112 can be entirely internal, or expandable through the use of removable memory devices. In a larger PCD, the data I/O ("Input/Output") 114 could be a keyboard or data pad, but in smaller, handheld PCDs, such as the preferred embodiment of the present invention, the data I/O 114 is either a keyboard that is integrated into the PCD or a pressure sensitive touch screen that is integrated into the display 116 and controlled by the user with a stylus that allows the user to write characters within an on-screen software controlled input area or an on-screen software controlled keyboard. The Palm OS and Microsoft operating systems include handwriting recognition software, such as Graffiti and Jot, which enable users to print individual letters within the input area and have the corresponding characters displayed near the cursor on the display. Many PCDs, such as the Palm i705 Handheld, include connectors that enable additional input devices to be connected to the PCD through the data I/O 114. The display 116 would preferably be a color display, but monochrome displays, such as that used on the current version of the Palm i705 Handheld, would also be acceptable.

Figure 2:
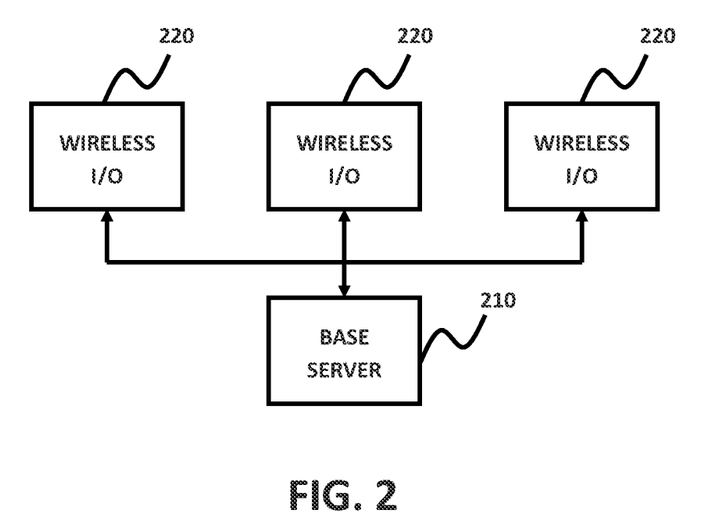
FIG. 2 is a block diagram illustrating one embodiment of a base server of the selection system of the present invention configured with wireless input/output devices.

The preferred embodiment of the PCD 100 also includes a wireless I/O 118 that utilizes either the radio waves of a wireless modem or infrared light to communicate with an externally located device, such as an email server, an Internet Service Provider, or a base station, such as the base server 210 illustrated in FIG. 2, through one or more wireless I/O devices 220 connected to the base server 210. The PCD 100 also preferably includes a geo-positional satellite ("GPS") receiver 120, or similar locator device, so the PCD 100 can determine the exact location of the user within the store or other geographic area at all times. Alternatively, the GPS receiver could be connected to the PCD 100 as an expansion device 122. In the absence of a GPS receiver, other technologies could be used to determine the location of a user, such as different physical zones identified by some unique characteristic, such as a different carrier wave used to communicate within each zone. Also, for example, each of the three wireless I/O devices 220 depicted in FIG. 2 could send a signal to the PCD 100 at the same time, measure the response time of the PCD 100 to each signal, and triangulate the user's location based on those response times.

Less expensive versions of the PCD 100 could also be developed without either a wireless I/O or a GPS receiver. Such PCDs would be configured with a connector that enables the PCD 100 to physically connect, or dock, with the external base server 210 instead of wirelessly connecting with the base server 210. The base server 210 could be any one of a number of commercially available workstation-type computers manufactured by Sun Microsystems, IBM or Silicon Graphics, and would include a primary computer for processing information, internal and external storage for assisting the computer and for storing databases of additional information about products, such prices, alternatives to products, location information for products, incentive discounts available through manufactures or distributors, etc., and an I/O system for communicating directly with the PCD 100 or indirectly through the wireless I/O devices 220. All of the computer, wireless and physical connection technologies necessary to perform such processing, storage and communication functions are well known in the art. As noted above, the preferred embodiment of the present invention would also include an expansion slot that enables users to connect one or more expansion devices 122 to the PCD 100, such as pagers, modems, MP3 players and more.

Figure 3:
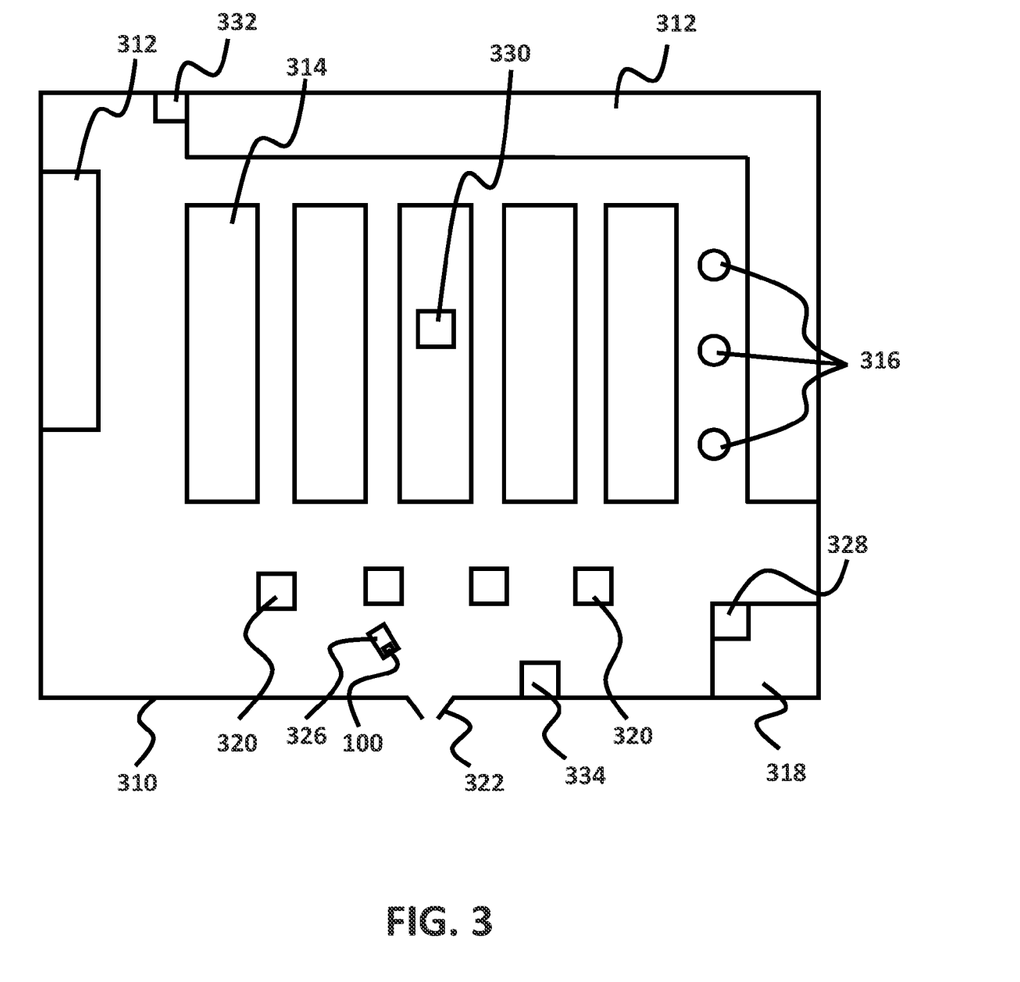
FIG. 3 is a top plan view of the layout of a grocery store configured to operate with the base server and wireless input/output devices of FIG. 2.

With reference now to FIG. 3, the preferred and alternative embodiments of the invention are illustrated within the environment of a grocery store 310. In particular, FIG. 3 illustrates a top view of the layout of the grocery store 310 configured to operate with the base server 210 and the wireless I/O devices 220 of FIG. 2. The grocery store 310 includes a number of large refrigerated display sections 312 along the interior walls, a number of central aisles 314, and a number of special display areas or stands 316. Within the grocery store 310 is an office 318 that is used by the managers for overseeing the operation of the store and monitoring the check out stations 320. Rear storage space, loading areas, and other such facilities common to such retail stores are not shown. A user entering the grocery store 310 through its front door 322 with the PCD 100 could attach it to a holding place on a grocery cart 326 or simply hold the PCD 100 in their hand while they walked through the grocery store 310.

As previously noted, the PCD 100 is preferably a wireless device capable of remotely communicating with one or more wireless I/O devices, such as cellular sites, located over a large geographic area. Cellular telephones, for example, wirelessly connect to a cellular network by initially connecting to the first cellular site with the strongest signal, and as the cellular telephone user moves, the connection to the first cellular site is handed off to another cellular site with a stronger signal in order to keep the user connected to the cellular network at all times. Each of these cellular sites is in turn connected to one or more central stations that route users' calls to other central stations and to other cellular users, or to the homes or businesses the users are calling. This same type of function could be utilized in the present invention. In the preferred embodiment of the present invention, a number of wireless I/O devices, i.e., the wireless base stations 328, 330 and 332, are located throughout the store 310 to ensure that each user within the store is able to maintain a connection with the in-store selection network. The base stations are preferably mounted near the ceiling of the store 310 and pointed in a generally downward direction in order to improve their ability to establish and maintain a connection with PCD 100.

When the PCD 100 first enters the store 310, it might establish a connection with base station 328 because it is closest to the front door 322 and has the strongest signal. Once the user begins to move throughout the store, the connection to the PCD 100 might be passed from base station 328 to base station 330, and then from base station 330 to 332, etc. Each of these base stations is in turn in connection with one or more central stations, such as the central selection server 334. In the store 310, the central selection server 334 is located near the ground so PCDs without wireless communication capabilities can be directly connected to a data I/O of the selection server when a user enters or exits the store. Similar data I/Os could be located throughout the store to enable users to stay in contact with the selection server while they shop. Alternatively, the PCD 100 could use wireless messages to communicate data to remotely located base stations or cellular sites, which in turn communicate with a remotely located selection server. In other words, no equipment, other than the PCD 100, needs to be physically located within the store 310 in order to practice the present invention. In this manner, the store 310 would not need to purchase special equipment for each store and one selection server could serve many different users at many different stores simultaneously.

Since many people currently use PCDs to maintain contact lists, calendars and To Do lists, it will be second nature to such people to use a PCD as an alternative to a shopping list. This has been demonstrated by the popularity of shopping list software that is significantly less functional than the present invention. This invention is not limited to grocery stores and grocery store lists, however, users could also create lists of items on their PCD that they wanted to locate and possibly buy in a wide variety of locations, such as warehouse-like discount stores and hardware stores, or even shopping malls. Even if a user had not created a list before entering an establishment, the user could still use the selection system of the present invention to obtain, locate or select and purchase items. For example, the selection system could be used at a baseball park, football stadium, college campus, a city center or similar geographically limited area during the course of an event to locate food, drinks, souvenirs, or even the nearest bathroom. A user at a game could communicate with a selection server operated by or in cooperation with the park or stadium vendors. Once connected to a user, the selection server could obtain the user's seat location and present the user with a list of items that could be delivered to the user based on their seat location during the game. Ideally, such items would be located near the user's seat location at the event so they could be quickly delivered to the user while still hot or cold. A user could even pay for selected items using the PCD so she didn't need to exchange money when the items arrived.

The grocery store application, however, is probably one of the best uses of the present invention. Grocery store lists are created as people realize they need items and those items are generally not listed in the same order that such items are located throughout the store. Even when a user lists every item in the perfect order, the person shopping often misses an item in one aisle and either fails to buy it or has to go back through the store and get that item later. Many times the person creating the list of items to be located is not the person who will end up shopping for those items and may be less familiar with the location of those items within the store, or the store has changed the items it is carrying or moved the stock around the store, so the whole shopping process takes them longer. Also, the person shopping for the items might not know which brand to pick or an acceptable alternative to a specific item on the list that isn't stocked. The entire process of listing items and shopping for those items is responsible for a significant amount of domestic strife that can be lessened through use of the present invention.

In the preferred embodiment of the present invention, users would first locate stores that are supporting the selection system. Such stores could produce lists of items available within their store using a "list" software application that could be downloaded to a user's PCD either through the Internet from a website, by connecting to the store's selection server, or even by communicating with another PCD that had already downloaded the list application. These list applications would be specifically designed to run with that store's selection server. Alternatively, users could simply download a generic list application program that enabled them to create lists for use with any selection server.

Once a user had loaded the list application on the PCD 100, they could add items to the list at any time, even while shopping within the store. Ideally, the user would set the PCD 100 up at a convenient location, perhaps on a counter within the user's kitchen or on a stand mounted to a wall, and add items to the list as the need for such items was recognized. While the kitchen is an ideal location if the type of list being created is for use at a grocery store, as previously noted, the present invention is not limited to grocery store lists. For example, a user could create generic lists of different types of items; download industry specific applications for each type of store (i.e., grocery, hardware, clothing, etc.); download store product lists from different retailers (i.e., Safeway, Giant, Wal-mart, Costco, Target, etc.); or even download store product lists for differently configured stores operated by the same retailer (i.e., the Safeway on Main Street and the Safeway on Skyler Avenue). All of these lists could be stored on the PCD 100, stored on removable storage devices, or only loaded onto the PCD 100 as desired by a user.

Figure 4:
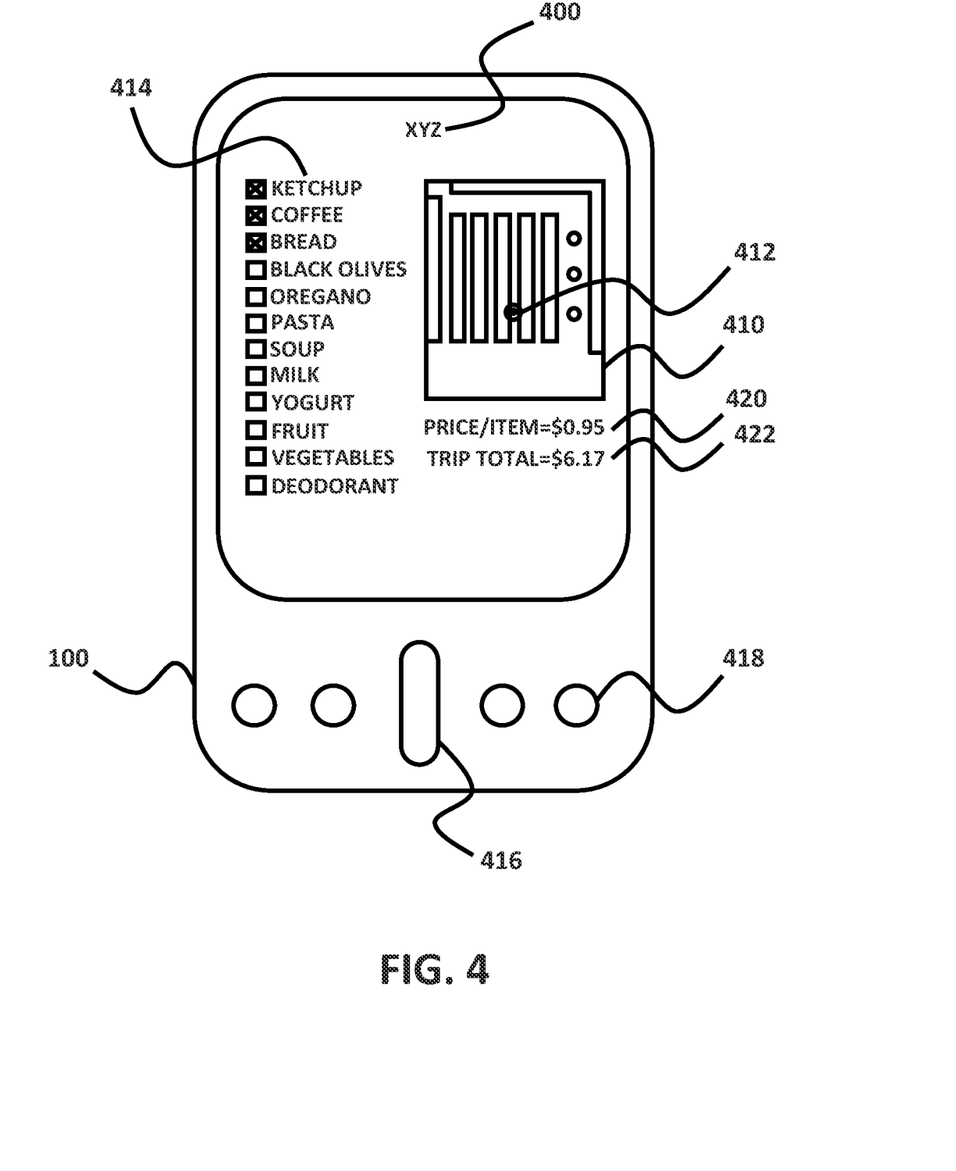
FIG. 4 is a top plan view of the portable computing device of FIG. 1 displaying an interactive list and visual cues for locating items within the grocery store illustrated in FIG. 3.

Referring to FIG. 3 and to FIG. 4, upon entering the store 310 with a wirelessly enabled PCD 100, a connection would be established between the PCD 100 and the selection server 334, either through a direct physical connection or through one of the wireless base stations 328, 330 or 332. Once a connection had been established, the PCD 100 would then upload the appropriate list for that store to the selection server 334. The selection server 334 would then check the contents of the list against a database of products within the store 310, produce a visual map 410 of the store with marks 414 indicating the location of the first item and each subsequent item on the list 412 within the store of each product on the list, and download the map to the user's PCD 100. If the store 310 was called the XYZ store, then a label for the XYZ store 400 might be displayed at the top of the display, as shown in FIG. 4.

Instead of a visual map, the location of items could be indicated by aural cues, such as a series of beeps or tones, or displayed in many other ways. For example, the base station could download detailed text-based information about the location of each of the items on the user's list, such as an aisle number (i.e., Aisle 7), the side (i.e., 7A or 7B), a shelf height, etc. If a user did not have a wirelessly enabled PCD 100, the user could alternatively connect the PCD to selection server 334 or as previously noted, connect to numerous physical connection points distributed throughout the store. Many PCDs are equipped with inexpensive optical sensors, so users might only need to communicate with an optical sensor connected to the selection server 334.

If the price of appropriately equipped PCDs was still beyond the budget of most users of a particular store, the store could supply PCDs to users to use while in the store. To prevent the PCD from being stolen, the PCDs could be secured to the store's shopping carts. Users could then enter information directly into the PCD, or they could submit a list of items to the selection server 334, which could scan in the user's written list and create an electronic version of the list on the PCD 100. The effectiveness of this solution, however, will be highly dependent on the quality of the user's handwriting, the language used to create the list, the scanning, character and word recognition capabilities of the selection server, etc. If a store provides preprinted lists that users can simple mark off, like a computer-readable answer sheet, then this will be a much more effective solution.

Once a user loaded product location information onto their PCD 100, the user can proceed to locate the listed items within the store 310. As noted, the downloaded information can include location marks or indicators, such as a cue or blinking indicator 412, on the visual map 410, to further assist the user in locating the item. Alternatively, the PCD could beep when a user neared a desired item within the store. Either way, this feature could free store staff from having to spend so much time helping customers find items within the store. All of the visual indicators could be displayed on the visual map 410 at once, or one at a time could be displayed based on each user's preference.

As previously noted, the downloaded list 414 does not have to be in the same order as the list uploaded to the selection server 334. For example, when creating a list, a user could write items on the list in any order they desired, or in accordance with a predetermined form list provided by the store.

When the selection server 334 received a list, it could organize the list based on the location of the user within the store, i.e., front left corner of the store, or a user specified preference, or the location of the items on the uploaded list within the store 310. User could then start at one end of the store and move to the other end of the store, picking up all of their items along the way, without having to go back through the store to collect missing or hard to locate items, regardless of where the user begins to shop within the store.

If a specific item was not available in the store, the selection server could let the user know as soon as the reorganized list was downloaded to the user's PCD 100. The user could then either chose to eliminate that item from their list, or the selection server could provide the user with an alternative to the selected item, possibly together with information as to why the alternative might be acceptable. If a user had downloaded a list application from the store before creating their list, then the user would know which items the store carries and would not even select items not offered by the store. If items normally carried by the store were out of stock, then the selection server could treat the situation the same as though the item wasn't carried by the store. Although, the store could even let the user know when the item was scheduled to be delivered to the store so the user could back order the item and pick it up at a later date.

Since ketchup was the first item on the list 414 and, in the store 310, ketchup is located in the last aisle on the right hand side of the store, the PCD 100 might therefore have the user start on that side of the store by blinking a location mark or indicator where the ketchup was located. Once the user picked up the ketchup, and crossed ketchup off the list, i.e., using a stylus (not shown) for directly manipulating visual objects shown on the touch-sensitive screen of the PCD 100, the PCD would automatically identify the location of the next item (coffee) on the list, i.e., by blinking an indicator where coffee was located within the store 310. As shown on the list 414, the user has already located the first three items and is now looking for black olives, which might be located in the store as shown by the mark 412. If the user checked or crossed black olives off the list, the PCD 100 would then display the location of oregano, and so forth. Rather than use a stylus, users could manipulate through the list or the screens on the PCD, or by moving a cursor down the list 414 by means of traditional control mechanisms of many portable computing devices, such as the toggle 416, the buttons 418.

In addition to displaying the location of items within the store, the PCD could be used to display pricing information 420 about each item, comparative price information between different choices of products (i.e., 18 oz of canned black olives for $1.49, $0.083/oz, by manufacturer A compared to 16 oz of canned black olives at $1.23, $0.077/oz, by manufacturer B). Product manufacturers or stores, such as the XYZ store 400, could take advantage of the information supplied by the user (i.e., the fact that the user wants certain types of information, a certain brand, etc.), to download specific information about their products, or electronic coupons for discounts on certain types of products, directly to the user while they are shopping, versus before they came in or after checking out of the store, on their way out. This targeted proximity advertising information could be displayed on the PCD 100 in place of or in addition to the pricing information 420, within the list 412 (i.e., "coffee" could be replaced with "Folger's coffee" or "Peets Major Dickenson's" blend), or on a different screen of the PCD that users would turn or page to upon seeing a blinking indicator associated with certain items on the list. Advertisement, community service messages, funny sayings, famous quotes, or a wide variety of other bits of additional information could also be loaded on to the PCD 100 for display to the user at appropriate times. In addition to pricing information, the PCD 100 could also keep a running total or a visit total 422, of the cost of the items selected by a user during a visit. In the later case, the user might have to indicate the total number of each item purchased so the PCD could maintain an accurate total. If a user had input a budget into the PCD 100 before shopping, the PCD 100 could let the user know where the user was in relation to using up that budget.

If a PCD is wirelessly enabled, the base stations could periodically communicate with the PCD 100 to adjust the list as the user made changes or additions, or to upload targeted advertisements or other information as needed by the PCD. If the PCD 100 is equipped with a GPS or similar device so as to pinpoint a user's exact location within the store, or by calculating the triangulated position based on how quickly the PCD responds to different signals broadcast by different base stations, or by simply guessing the user's position within the store at any particular moment (i.e., if a user has already crossed off bread, but has not yet crossed off black olives, then the user must be close to a certain aisle), then the store could also display advertisements for products near the user that were not on the user's list.

If a store did not want to establish or maintain a separate database containing the price of items within the store, or of certain items within a store, such as specialty items, so the PCD 100 could track the visit total 422, then alternative price, price comparison and visit totals could be developed using other tools. For example, the PCD could be equipped with bar code scanning capabilities that would enable users to scan in necessary information from products as they shopped. This scanned information could then be used by the PCD 100 to indicate prices to users, visit totals, price comparisons, etc.

Similarly, if a PCD was equipped with trusted identification or secure payment features, the user could simply present their PCD 100 to a clerk during check out and have the cash register automatically process payment through a pre-determined credit card, or based on funds deposited with the secure payment system. While the payment process was ongoing, or before the payment process was initiated, the clerk could proceed to bag the user's items, while simultaneously verifying the items in the user's shopping cart against the items registered with the PCD 100. Self service stores could even eliminate the need for clerks by requiring users to run items through a secure scanner to identify items and verify pricing, while processing the payment data supplied by the user.

Figure 5A:
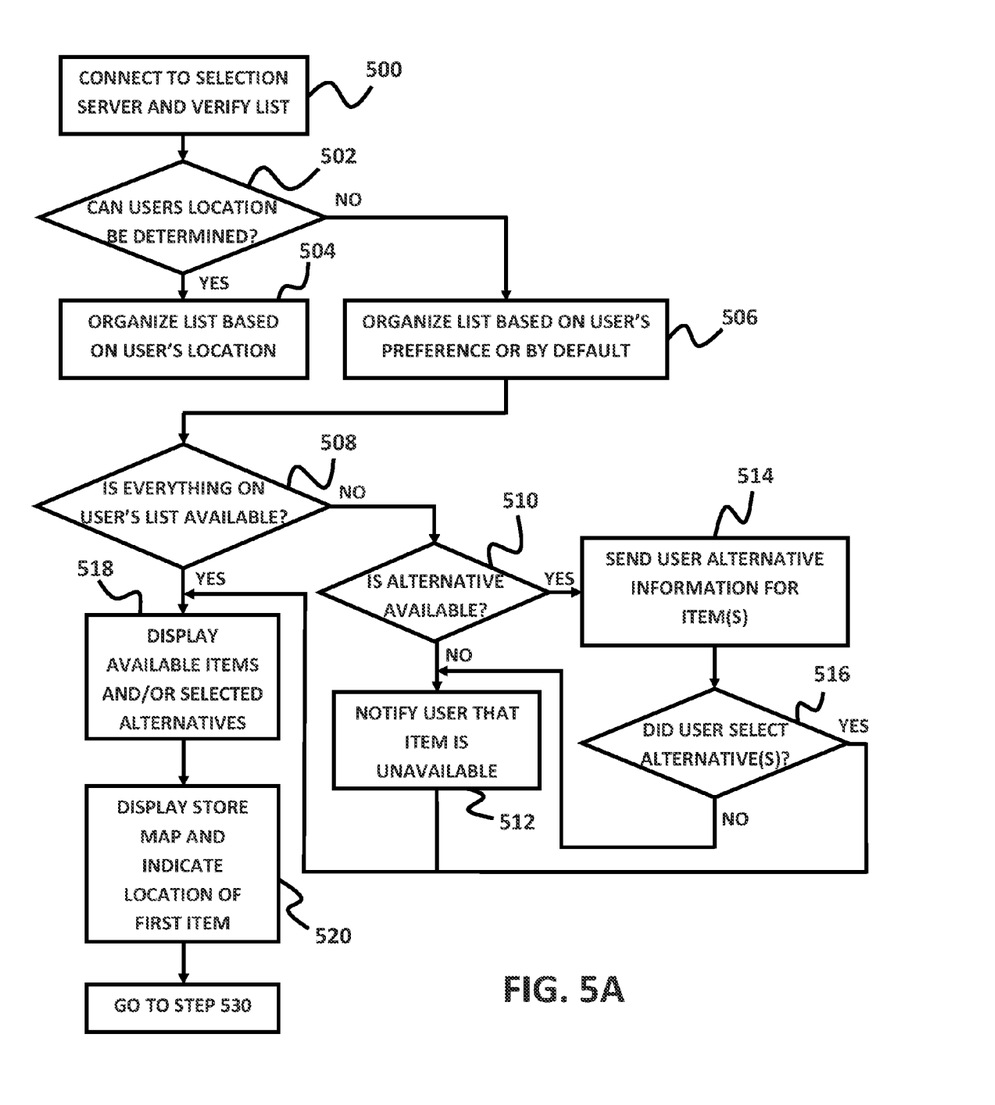
FIGS. 5A and 5B are flow charts illustrating the basic operation of the selection system of the present invention within the grocery store of FIG. 3.
Figure 5B:
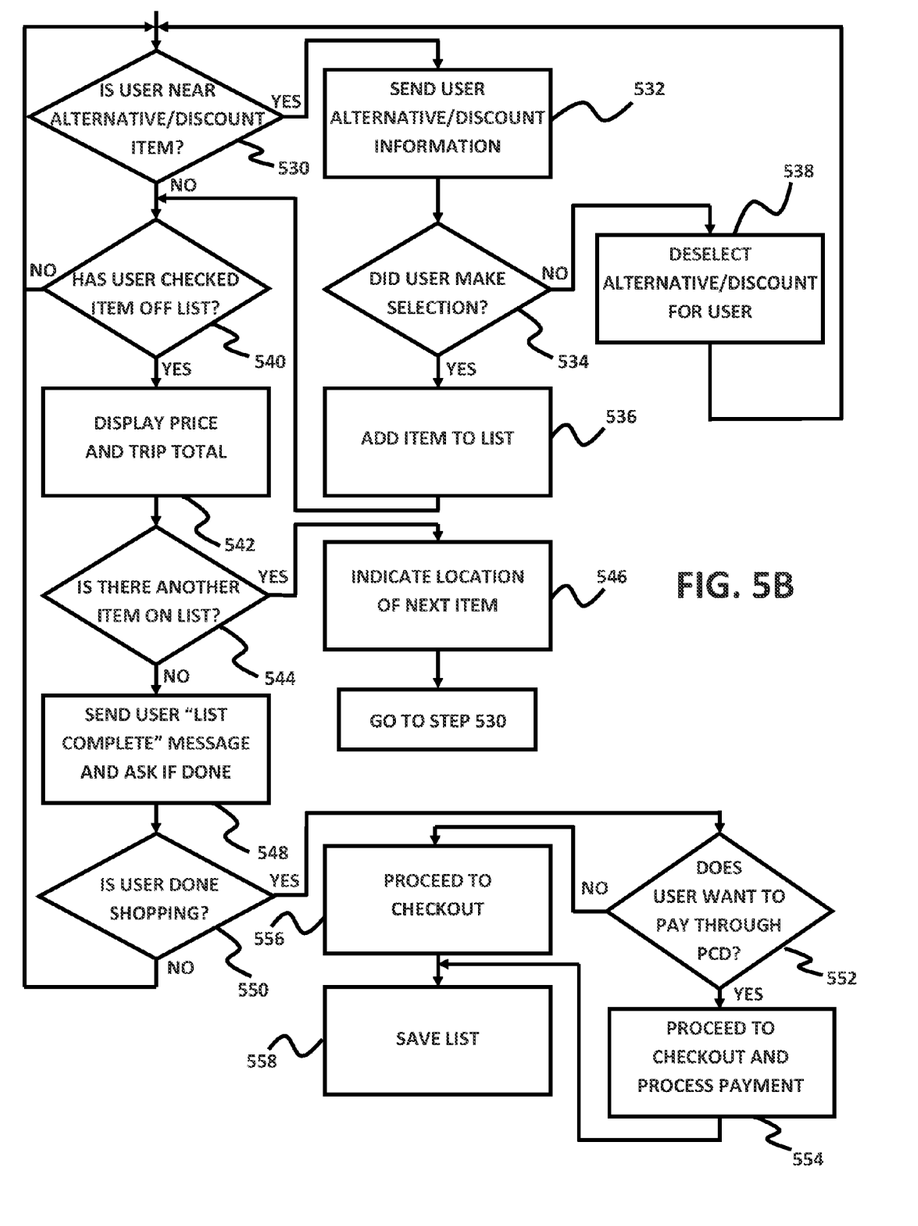

A flow chart further illustrating a simplified version of one way in which the selection system of the present invention could operate within the grocery store 310 of FIG. 3 is illustrated in FIGS. 5A and 5B. In Step 500, the PCD 100 first establishes a connection with the selection server 334, which then verifies the user's uploaded list to make sure the list is for the correct store or to check for other issues. In Step 502, the selection server 334 attempts to determine if the user's location can be determined, such as through use of a GPS device, triangulation, etc., and if it can, the selection server 334 then organizes the list based on the user's location within the store 310, Step 504. If the user's position cannot be determined, the selection server 334, as is illustrated in Step 506 organizes the list by default (i.e., starting every other user on the right hand side of the store, or some other default setting) or if the user has entered an organizational preference with the uploaded list, then the selection server 334 would automatically follow that preference.

In Step 508, the selection server 334 then checks the user's list to determine if everything is available within the store 310. If an item is not available, then the selection server 334 would attempt to determine if an alternative was available, Step 510, and if not available, then it would notify the user accordingly through the PCD 100, Step 512. If one or more alternatives were available, then in Step 514, the selection server 334 would send alternative information to the user, such as different brand names or even different types of items that the user may not have realized were similar to the missing item(s). The selection server 334 could even instruct the PCD 100 to display comparative information about the alternatives and the desired item(s) to further help the user decide.

If the user selected an alternative, then the process would continue to the next step, but if the user did not select all of the alternatives, then for each item not selected, the user would again be instructed that the desired item is unavailable by returning to Step 512. Rather than identify unavailable items and alternatives before the user started shopping, the selection server 334, could perform this function while the user was actively shopping, such as when the user came to an unavailable item and had a chance to see the other items available, which would make it more likely that a user would select an alternative. Once all of the available and alternative items had been determined, a list of those items would be displayed on PCD 100, Step 518. In the preferred embodiment of the present invention, in addition to displaying the list of items, the selection server 334 would also send a store map and an indication of where the first item on the list could be located for display on the PCD 100, Step 520.

Once the user had obtained the organized list, a store map, and an indication of the location of the first item, the user could disconnect from the selection server 334 if necessary. If the user did not have the ability to maintain a connection with the selection server 334, then the user might want to make sure that she had collected all of the alternative choices for items before disconnecting. In Step 530 of FIG. 5B, however, it is assumed that the user can maintain a connection with the selection server 334 while moving through the store and the position of the user within the store can either be determined or fairly accurately guessed. For example, it might be possible to make a fairly accurate guess as to the user's current position within the store based on the last item selected by the user and the next item on the user's list relative to those items within the store. Thus, based on at least the user's location and the items on the user's list, the selection system will attempt to market an alternative to the user, or offer the user a discount on the desired item(s) or an alternative item, or simply provide the user with information about the different products, Step 532.

If the user selects the alternative item, Step 534, then that item is added to the user's list, Step 536. If the user marks the item as having been selected, then the alternative item is treated like any other item on the user's list. The item that the alternative replaced would not be, however, automatically taken off the list so the information was not lost. The user would have to delete the item to remove it from the list, but the user could mark the item as not having been selected. If the user did not select the alternative, then the alternative would be marked as having been already provided to the user so that the same alternatives are not offered over and over, Step 538. This last step explains why Step 530 asks whether the user is near a "new" alternative, versus any alternative that could be available. A discount offer would be handled in much the same manner as a marketed alternative. If a user selects a discount offer or purchase incentive, then the incentive would be added to the user's list and processed at check out, provided the user met the terms of the offer. Other information and actions could be performed in a similar fashion to alternatives and discounts, especially in environments other than grocery stores.

In Step 540, the selection system tests to see whether a user has checked the item currently marked on the map off their list by changing its status or state from that of an unselected or un-located item to that of a selected item. If the status has not changed, then the selection system assumes that the user has not yet arrived at that item or is looking at other items, in which case the process loops back to the alternative/discount subroutine discussed above. If the user checks an item off the list, then the system assumes the user has selected the item and wishes to purchase the item. The user could also reject the item, for example if the item did not meet their needs or quality expectations, and the system would automatically move on to the next item on the list, without updating the visit total. Other symbols, such as deletions or cross-offs, could be used to indicate items that have not been selected. In Step 542, since the user has checked the item off the list, the selection system displays the price for the item and the cumulative trip/visit total. Although not shown in FIG. 5B, the system could also ask the user if multiples of an item were selected, and if so how many, in which case the visit total would be computed by multiplying the price of the selected item by the number of such items selected.

Once an item has been selected, the selection system checks to see if there is another item on the list, Step 544, and if so, indicates the location of the next item, Step 546. This process returns to Step 530 and repeats until there are no more items on the user's list, in which case, the user is sent a message that the list has been completed and queries whether the user is done shopping, Step 548. In Step 550, it is determined whether the user has finished shopping. If not, the process returns to Step 530 and repeats until the user has stopped shopping, or perhaps the system performs some other function not illustrated. If the user has stopped shopping, the selection system then determines whether the user wants to pay through use of the payment mechanism utilized by the PCD 100, or in some other way, Step 552. If the user chooses to use the PCD to pay for the selected items, when the user arrives at the check out (point of sale) station, the selected items are verified against the items included in the trip/visit total, and if they match, the user's payment is processed, Step 554. If they don't match, then the trip/visit total is adjusted according to the items actually selected by the user and the adjusted amount is submitted for payment processing. If the user wants to pay through a more traditional means, then the user simply proceeds to one of the check out stations 320. Once the user has been checked out and payment has been processed, the PCD 100 saves the list so it can be used again the next time the user shops, or used as the basis for a new list of items, Step 558.

The present invention, while illustrated and described in terms of a preferred embodiment and several alternatives, is not limited to the particular description contained in this specification. Additional alternative or equivalent components and steps could be used to practice the present invention.

What is claimed is:

1. A method for providing a coupon to a user of a portable computing device, comprising the steps of:

determining, by a portable computer device, a location of the portable computer device within a geographic area;

identifying, by the portable computer device, a particular item on a list of items stored on the portable computer device, the list of items indicating items are desired by a user of the portable computer device;

determining, by the portable computer device, that the particular item is available within the geographic area;

determining, by the portable computer device, an alternative item based on the particular item;

selecting, by the portable computer device, a coupon based on the particular item and based on the determination that the particular item is available within the geographic area, the selected coupon being for the alternative item;

presenting, by the portable computer device, the selected coupon;

presenting, by the portable computer device, a map of at least a portion of the geographic area; and displaying, by the portable computer device, an indicator of a location of the alternative item on the presented map.

2. The method as recited in claim 1, wherein the alternative item is similar to the available item.

3. The method as recited in claim 1, wherein the alternative item is dissimilar to the available item.

4. The method as recited in claim 1, wherein selecting the coupon is based on the user's location in proximity to the item.

5. The method as recited in claim 1, wherein the geographic area is one of a grocery store, a warehouse store, a shopping mall, and a special event location.

6. A computer program product, comprising:
a non-transitory computer-readable medium having computer-readable program instructions embodied therein that when executed by a computer perform a method for providing a coupon to a user of a portable computing device, the computer-readable program instructions comprising:
computer-readable program instructions to determine an availability within a geographic area of a particular item on a list of items stored on a portable computer device;
computer-readable program instructions to determine an item that is an alternative to the particular item;
computer-readable program instructions to select a coupon based on the item on the list of items and based on a determination that the particular item is available within the geographic area, the selected coupon being for the alternative item; and
computer-readable program instructions to present the selected coupon on the portable computer device to the user;
computer-readable program instructions to display, on the portable computer device, an indicator of a location of the alternative item within the geographic area.

7. The computer program product of claim 6, the computer readable program instructions further comprising computer-readable program instructions to display, on the portable computer device, an indicator of a location of the particular item within the geographic area.

8. The computer program product of claim 6, wherein the geographic area is one of a grocery store, a warehouse store, a shopping mall and a special event location.

9. The computer program product of claim 6, the computer readable program instructions further comprising computer-readable program instructions to determine a location of the portable computer device within the geographic area and a location of the particular item within the geographic area.

10. The computer program product of claim 9, wherein selecting the coupon is further based on the location of the portable computer device in proximity to the particular item.

11. The computer program product of claim 6, the computer readable program instructions further comprising:
computer-readable program instructions to determine items within the geographic area selected on the portable computer device; and
computer-readable program instructions to determine a total cost of the selected items.

12. The computer program product of claim 11, the computer readable program instructions further comprising computer-readable program instructions to compare the total cost to a budget of the user.

13. The computer program product of claim 11, the computer readable program instructions further comprising computer-readable program instructions to communicate with a check out system to obtain payment of the total cost from the user.

14. A method for providing a coupon to a user of a portable computing device, comprising the steps of:
determining, by a portable computer device, a location of the portable computer device within a geographic area;
identifying, by the portable computer device, a particular item on a list of items stored on the portable computer device, the list of items indicating items are desired by a user of the portable computer device;
determining, by the portable computer device, that the particular item is unavailable within the geographic area;
determining, by the portable computer device, an alternative item based on the particular item;
selecting, by the portable computer device, a coupon based on the particular item and based on the determination that the particular item is unavailable within the geographic area, the selected coupon being for the alternative item;
presenting, by the portable computer device, the selected coupon;
presenting, by the portable computer device, a map of at least a portion of the geographic area;
displaying, by the portable computer device, an indicator of a location of the alternative item on the presented map.

15. The method as recited in claim 14, wherein the alternative item is similar to the unavailable item.

16. The method as recited in claim 14, wherein the alternative item is dissimilar to the unavailable item.

17. The method as recited in claim 14, wherein selecting the coupon is based on the user's location in proximity to the item.

18. The method as recited in claim 14, wherein the geographic area is one of a grocery store, a warehouse store, a shopping mall, and a special event location.

19. A method for providing a coupon to a user of a portable computing device, comprising the steps of:
determining, by a portable computer device, a location of the portable computer device within a geographic area;
identifying, by the portable computer device, a particular item on a list of items stored on the portable computer device, the list of items indicating items are desired by a user of the portable computer device;
determining, by the portable computer device, whether the particular item is available within the geographic area;
selecting, by the portable computer device, a coupon based on the particular item and based on the determination regarding whether the particular item is available within the geographic area;
presenting, by the portable computer device, the selected coupon;
determining, by the portable computer device, items within the geographic area selected by the user;

determining, by the portable computer device, a total cost of the items within the geographic area selected by the user; and verifying, by the portable computer device, at a self service check out the items within the geographic area selected by the user, wherein the items are verified by comparing the items within a geographic area selected by the user against the total cost.

20. The method as recited in claim 19, further comprising comparing, by the portable computer device, the total cost to a budget of the user.

21. The method as recited in claim 19, further comprising obtaining, by the portable computer device, a payment of the total cost from the user, in response to verifying the items.

* * * * *